United States Patent [19]
Hebbel et al.

[11] 3,867,246
[45] Feb. 18, 1975

[54] CHLORINE-FREE MULTIPLE STEP BLEACHING OF CELLULOSE

[75] Inventors: Gerhard Hebbel, Traisa; Horst Kruger, Darmstadt, both of Germany

[73] Assignee: Deutsche Gold- und Silber-Scheideanstalt vormals Roessler, Frankfurt am Main, Germany

[22] Filed: Apr. 16, 1973

[21] Appl. No.: 351,783

[30] Foreign Application Priority Data
Apr. 21, 1972 Germany............................ 2219505

[52] U.S. Cl..................................... 162/76, 162/78
[51] Int. Cl......... D21c 1/04, D21c 3/04, D21c 9/16
[58] Field of Search............... 162/78, 76, 33; 8/111

[56] References Cited
UNITED STATES PATENTS

| | | | |
|---|---|---|---|
| 1,828,848 | 10/1931 | Richter | 162/33 |
| 3,085,039 | 4/1963 | Gartner | 162/78 |
| 3,193,445 | 7/1965 | Parker et al. | 162/78 X |
| 3,345,250 | 10/1967 | Brinkley et al. | 162/78 |
| 3,382,149 | 5/1968 | Hoh | 162/78 |
| 3,457,023 | 7/1969 | Peloguin et al. | 8/111 X |
| 3,645,840 | 2/1972 | Lincoln et al. | 162/78 |
| 3,707,438 | 12/1972 | Lincoln et al. | 162/78 |
| 3,719,552 | 3/1973 | Farley et al. | 162/78 X |
| 3,720,577 | 3/1973 | Roymoulik | 162/78 X |

FOREIGN PATENTS OR APPLICATIONS
1,187,911  2/1965  Germany............................ 162/33

OTHER PUBLICATIONS
"Peroxides to Bleach Sulphate Pulp," K. G. Aitken, Canadian Chemical Processing; February 1953, pp. 42 & 44.
"Peroxyacete Acid Bleaching of Chemical Pulps" Bailey & Dence Tappi; Jan. '66, Vol. 49, No. 1, pp. 9–15.

*Primary Examiner*—S. Leon Bashore
*Assistant Examiner*—M. Steven Alvo
*Attorney, Agent, or Firm*—Cushman, Darby & Cushman

[57] ABSTRACT

Cellulose is bleached in the absence of chlorine in an aqueous medium in a plural of steps including (1) employing an inorganic or organic peroxide or hydroperoxide under alkaline conditions, (2) an organic percarboxylic acid or water soluble salt thereof under acid conditions and (3) an inorganic or organic peroxide or hydroperoxide under alkaline conditions again. An acid pretreatment can be employed.

20 Claims, No Drawings

CHLORINE-FREE MULTIPLE STEP BLEACHING OF CELLULOSE

Cellulose obtained chemically, such as results, for example, from the sulfite process or the alkaline soda- or sulfate process, besides cellulose contains small amounts of lignin, hemicellulose and several other materials. The mentioned materials associated with cellulose, especially lignin, effect the discoloration or the yellowing of cellulose or products produced therefrom. In order to produce highly white paper and other products from cellulose which are not inclined to yellow, it is necessary after the chemical pulping process to remove the residual lignin residues and other disturbing associated materials in a multistep bleach. Generally 3 to 8 steps are required. As bleaching chemicals today there are mainly added chlorine (C), chlorine dioxide (D) and sodium or calcium hypochlorite (H).

There are also used hydrogen peroxide (P) and recently molecular oxygen ($O_2$). Between the individual bleaching steps there are frequently introduced alkaline extractions (E). (C. W. Bailey and C. W. Dence, Tappi, Vol. 49, pages 9–15).

The customary bleaching sequence contains one or two chlorination steps with elemental chlorine as well as in most cases additionally one to two hypochlorate steps and one to two chlorine dioxide steps if a completely bleached cellulose (degree of whiteness = 88% MgO) is to be produced. Thereby there is formed above all a large amount of hydrochloric acid in the chlorination steps where for the most part there is added 4.0–8.0% $Cl_2$ based on the cellulose so that the waste water contains large amounts of hydrochloric acid or, if it is neutralized, sodium chloride. To a lesser extent this is true also for the hypochlorite bleach and the chlorine dioxide bleach.

The pollution with these inorganic materials and above all the organic materials dissolved from the cellulose in the bleaching, however, signifies a considerable loading of the waters into which the waste waters are discharged.

In this connection there have been endeavors to replace the chlorine bleaching step with molecular oxygen. Thereby the operation must be carried out with the use of excess pressure and it is furthermore open to question whether in every case the loss in strength caused by the alkaline oxygen pressure treatment can be prevented through the additives proposed in the literature.

However, there is still not known a process in which the inclusion of a chlorine containing bleaching agent can be given up by using oxygen.

As examples of the bleaching processes used today there may be mentioned the series of steps C/E/H, C/E/H/E/H, C/E/H/H, C/E/H/D, C/E/D/E/D, C/E/H/D/P, C/E/H/D/E/D, C/E/H/E/D and C/E/H/D/E/H.

Recently there also has been investigated the capability of the following sequences $A/O_2/D/E/D$, $O_2/D/E/D$, $A/O_2/D/P/D$. (A signified an acid pretreatment, $O_2$ signifies molecular oxygen bleach) (G. Rowlandson, Tappi 54, No. 6, pages 962–967(1971)).

The alkaline final step is generally connected with a neutralization with sulfurous acid or other acid which, however, is not generally counted in the bleaching step. In the chlorination steps additional chlorine dioxide can be added, for example, in the ratio $Cl_2:ClO_2 = 10:1$ or 20:1.

It has been reported in patents and publications that peracetic acid can be added as the bleaching agent in a single step bleaching of cellulose containing material or in one step of a multistep bleaching of cellulose containing material.

In all of the previously described bleaching processes in which a cellulose is fully bleached to a degree of whiteness of at least 88% MgO, or better still to at least 90% MgO, ordinarily at least 2–3 bleaching steps with chlorine containing bleaching agents are used. This is also true if a peroxide bleaching step is present in the plural step sequence.

In contrast there has now been found a plural step process for completely bleaching cellulose in which the addition of chlorine or chlorine containing compounds can be completely eliminated. In these bleaching processes, which in a given case can be preceded by an acid pretreatment of the cellulose as is described in the literature (P. Rerolle, H. H. Myburgh and A. Robert, Pulp and Paper International, July 1969 pages 29–31; G. Rowlandson, Tappi 54, No. 6, pages 962–967(1971)), the cellulose is bleached in a first step with a peroxide, then in a second step with a peracid e.g., a peralkanoic acid of 2 to 5 carbon atoms or percarbonic acid, and in the third step again with a peroxide.

With difficultly bleachable cellulose or to save bleaching agent there can be added to the three step bleach at least one per acid and/or peroxide step. Difficultly bleachable celluloses, for example, are sulfate celluloses.

There has been found especially favorable the sequence which ends with a peroxide step, as, for example, in the 5 step sequence : step 1 hydrogen peroxide, step 2 peracetic acid, step 3 hydrogen peroxide, step 4 peracetic acid, step 5 hydrogen peroxide.

Since in this sequence not only chlorine but also the water glass employed in peroxide bleaches can be eliminated, there is the possibility of recycling the waste water from the individual steps so that finally a relatively concentrated bleaching waste liquor is formed which can be incorporated without further processing into the cook liquor evaporation and burning or chemical recovery. This is true in the use of NaOH as the base in the peroxide steps at least for all the sulfate-, polysulfide-, soda-, sodium carbonate and sodium sulfite cellulose processes.

In using other bases such as calcium hydroxide or ammonia this is equally true also for the remaining cellulose processes (calcium bisulfite processes, ammonium bisulfite processes and magnesium bisulfite processes).

The following examples illustrate the invention. In the examples the percentages are always given as weight % based on the unbleached oven dried calculated cellulose. As pulp consistency there is meant the weight % of cellulose in the pulp.

As peroxides and hydroperoxides there can be used hydrogen peroxide, sodium peroxide and other inorganic or organic peroxides as well as hydroperoxides. Preferably there is used hydrogen peroxide, sodium peroxide or t-butyl hydroperoxide in aqueous solution.

Examples of other suitable peroxides and hydroperoxides include potassium peroxide, calcium peroxide, cumene hydroperoxide, benzoyl peroxide, diacetyl peroxide, cyclohexyl hydroperoxide, t-amyl hydroperoxide, di-t-butylperoxide, dicumyl peroxide, methyl ethyl ketone peroxide. The amount of peroxide or hydroperoxide added can be between 0.5 and 10.0 weight percent, preferably between 0.5 and 6.0 weight percent, calculated as 100% hydrogen peroxide and based on the oven dried calculated weight of the cellulose used. The peroxides used in the first and third steps can be the same or different. It is also possible to employ several peroxides and/or hydroperoxides together in a single step.

As the percarboxylic acid there can be used peralkanoic acids, e.g. those having 2 to 5 carbon atoms such as peracetic acid, perpropionic acid, perbutyric acid, perisobutyric acid, pervaleric acid or perisovaleric acid. The amount of percarboxylic acid can be between 0.5 and 6.0 weight percent, preferably between 0.5 and 3 weight percent calculated as 100% hydrogen peroxide and based on the oven dried calculated weight of the cellulose used. Mixtures of percarboxylic acids can be used.

The treatment can be carried out at a temperature of 20°C. to 140°C., preferably between 40°C. and the boiling point of the bleach liquor.

In the experiments there was employed tap water of 5°C. with addition of 100 grams of cellulose (dry weight). As a reaction vessel there were employed enameled containers which were kept in thermostatic heat cabinets during the bleaching process. After each step the cellulose was washed with tap water and after the last step it was acidified with $SO_2$. The stated degree of whiteness was determined by the German standard method (Cellulose Chemistry pamphlets) with a Zeiss-Elrepho-Degree of Whiteness Measurer, Filter R 46. By pulp consistency is meant the weight percent of cellulose in the pulp. Kappa number is according to the Scandinavian standard method.

EXAMPLE 1

A spruce wood paper cellulose produced by the calcium bisulfite process (kappa number 15.6; degree of whiteness unbleached 50.3% MgO) was bleached in a five step sequence under the following conditions:
Step 1. 1.3% $H_2O_2$ 2% NaOH, 12% pulp consistency, 65°C., 4 hours treatment
Step 2. 0.6% peracetic acid, 12% pulp consistency, 75°C., 4 hours treatment
Step 3. 0.75% $H_2O_2$, 1.5% NaOH, 12% pulp consistency, 65°C., 4 hours treatment
Step 4. 0.4% peracetic acid, 12% pulp consistency, 75°C., 4 hours treatment
Step 5. 0.5% $H_2O_2$, 1.0% NaOH, 12% pulp consistency, 75°C., 4 hours treatment In the peracetic acid steps at the beginning the pH value was 6.0.

A 40% aqueous peracetic acid was employed to start with. The concentration data for the second and fourth bleaching steps, however, are based on 100% peracetic acid.

The cellulose had a degree of whiteness of 91.3%MgO after the fifth step and after the third step of 88.9% MgO. The time of reaction of the peroxide steps can be shortened substantially by increasing the temperature, for example, by increasing the temperature to 100°C. the time can be reduced to 20 minutes. Analogously, indeed not in such a big dependency this is true also for the peracetic acid steps at such a high temperature.

As especially suitable has proven the three step sequence with a peroxide in the first step, peracetic acid in the second step and again a peroxide in the third step coupled with peracetic acid in a fourth step and again a peroxide in the fifth step to complete a five step sequence in which hydrogen peroxide or sodium peroxide are especially suitable as peroxides.

Furthermore it has been found advantageous to alternately bleach under alkaline conditions in the peroxide steps at a pH of 8-13 and under acid conditions with peracetic acid at a pH of 4.5-6.5 although with peracetic acid or other per acids in principle bleaching can likewise be carried out under alkaline conditions, e.g. up to a pH of XIX. 13. As previously indicated there can be used in place of peracetic acid other per acids such as perpropionic acid or percarbonic acid or their salts, e.g. alkali metal salts such as sodium peracetate, potassium peracetate, potassium perpropionate, sodium perpropionate, sodium perbutyrate, sodium percarbonate, etc. Peracetic acid, however, is preferred. The peracetic acid can be added not only as equilibrium peracetic acid but also in pure aqueous solution or can be produced in the cellulose pulp from acetic anhydride or glacial acetic acid and a peroxide such as hydrogen peroxide. Especially advantageous are the solutions which are obtained according to German Pat. Nos. 1,165,576 and 1,170,926 and Weiberg U.S. Pat. No. 3,264,364.

In place of hydrogen peroxide or another peroxide in principle there can also be used elemental oxygen having a partial pressure of about 10 atmospheres at, for example, 100°C. since it is known that in an alkaline aqueous medium using oxygen pressure in the presence of carbohydrates peroxides are formed which then eventually are similarly effective for bleaching as the initially added peroxides (O. Samuelson and L. Stolpe, Svenske Papperstidn. Vol. 72, No. 20, pages 662–66(1969)). To be sure the formed peroxide concentrations are comparably small which cannot be compensated for by the high oxygen pressure and the high pulp consistency ( 25 – 35 %) which is required by the bleaching with oxygen. Such high pulp consistencies are then at least necessary in the oxygen bleaching if they are to replace completely the otherwise customary bleaching step with elemental chlorine.

In contrast with peroxides according to the new process very good bleaching can be obtained without pressure, ant it is possible to produce good results at pulp consistencies of 10–15% which are obtainable with only small apparatus expense, whereby there still need be added in addition to the peroxide only small amounts of per acid as a further bleaching agent.

On principle the bleaching sequence required in the invention which begins with a peroxide step can be readjusted so that it begins with a peracetic acid step. However, it is more suitable to begin the true bleaching sequence with an intensive alkaline treatment with peroxide in order to manage with as little peracid as possible and thus to bleach as economically as possible.

If the true bleaching process is preceded by an acid pretreatment, on principle small amounts of peracid can also be added here although it should be as a rule more economical to concentrate the peracid addition to the second, and in a given case, still later steps of the true bleaching process. The acid treatment is designated in the literature expressly as a pretreatment. This is also true when starting with sulfurous acid and thus a treatment carried out under comparable conditions of pulp consistency, temperature, reaction time and pH value in the presence of small amounts of peracid before the true bleaching also is regarded as a pretreatment. As small amounts there are understood to be amounts of peracid of up to 0.25 weight % based on the cellulose to be bleached, whereby other acids can be added in addition.

EXAMPLE 2

Finally for comparison there was carried out a bleaching by a conventional method for comparison with the new bleaching method and employing the cellulose used in example 1.

Step 1. 4% $Cl_2$, 3% pulp consistency, 20°C., 1 hour treatment

Step 2. (extraction) 1% NaOH, 14% pulp consistency, 55°C., 2 hours treatment

Step 3. 1% active chlorine as NaOCl, 12% pulp consistency, 35°C., 2.5 hours treatment Step 4. 0.4% $ClO_2$, 14% pulp consistency, 70°C., 4 hrs treatment Step 5. 0.3% active chlorine as NaOCl, 12% pulp consistency, 50°C. 2.5 hours treatment The cellulose at the end of the treatment had a degree of whiteness of 91.3% MgO.

In order to most economically bleach using the new chlorine free process, the bleaching in the individual steps should be carried out at pulp consistencies of at least 10–15%, i.e. the wet pulp should contain at least 10–15 weight% of oven dried calculated cellulose. There can be used pulp consistencies up to 35%.

In order to produce a fixed bleaching effect at adequate water solubility of the bleaching agent in general less bleaching agent is required the higher the pulp consistency. Also according to the new process, the pulp, as is customary in using other bleaching agents, can be diluted after each bleaching step with dilutions or wash water or can be rinsed whereby, for example, there can result a pulp having a pulp consistency of 4.5%. The cellulose must then for an, in a given case, subsequent bleaching step again be partially dewatered to a pulp consistency of 10% or higher. The filtrate which results for its part can be drawn upon again in the previous bleaching step or steps as dilution or wash water. Simultaneously the water in the individual steps can be partially recycled.

According to this completely chlorine free and also water free bleaching process the water passage can be so fashioned that only the filtrate resulting from the first bleaching step after dilution and further dewatering is excluded. This filtrate, which now contains practically all of the organic materials dissolved out by the bleaching as well as the reaction products of the bleach chemicals can now be incorporated without further into the cook liquor evaporation and burning or utilization or in the chemical recovery, without requiring change in the essential process steps.

This is true in the use of NaOH in the peroxide steps, at least for all cellulose processes based on sodium containing cook liquors such as sulfate, polysulfide, soda, sodium carbonate, sodium sulfite and sodium bisulfite processes. In using $Ca(OH)_2$ in place of NaOH or $Na_2CO_3$ in the peroxide steps this is also true for the calcium bisulfite processes and in using $NH_3$ for all cellulose processes.

Herein now is seen a more substantial advantage of the new process over all of the previously known bleaching processes in which there does not generally exist in most cases the possibility of removal of the bleach waste water and which in a few cases exists only for a part of the bleach water.

This means in the conventional bleaching processes a waste water results which still contains organic materials dissolved from the cellulose in such amounts that the waters into which the waste water comes, in many cases still without going through a biological clarifying step, become laden in a period of time in an unacceptable manner with regard to the biological oxygen demand (BOD). Thereby there should still be considered that the bleach waste water in the conventional bleaching processes contains besides carbohydrates and their breakdown products, also in part chlorinated breakdown products of lignin which because of their very slow biological breakdown, create the illusion of a smaller than truly present danger.

In the bleaching of a cellulose there results, based on the unbleached cellulose, about 5–10 weight % of organic materials and about 6–12 weight % of inorganic salts or acids in the waste water.

In the pictured return and recycling of the water wanted or unwanted amounts of unconsumed bleaching agent present after the bleaching step can be supplied to one of the preceding steps. Thereby the different bleaching agents, peroxide and peracids, do not consume each other mutually. Naturally there can also be added together from the outset several peroxides in the peroxide steps and several peracids in the peracid steps.

In order to prevent decomposition of the per compounds in the presence of heavy metal ions, it may be necessary to add organic complex builders such as ethylenediamine tetraacetic acid, diethylenetriamine pentaacetic acid or nitrilotriacetic acid or their salts or organic N- and P- free complex builders such as polyhydroxy carboxylic acids as disclosed in Haschke, published German Pat. application 1,904,940, Haschke published German Pat. application 1,904,941 and published Haschke German Pat. application 1,942,556. The entire disclosure of the three Haschke published German applications is hereby incorporated by reference. The use of waterglass can also be relinquished.

In the case where the waste water resulting from the new process is separately evaporated and dried or burned, also is not incorporated in the cook liquor evaporation, there always results a substantial advantage over the customary bleaching methods since there is no need to fear corrosion by chlorine compounds and besides there results an ash which is practically free of sodium chloride and silicate.

The new, especially environmentally favorable, process is not limited to the complete bleaching of cellulose or other cellulose containing materials to a degree of whiteness of at least 88% MgO, but can also be employed for partial bleaching of celluloses to lower degrees of whiteness.

The process is preferably carried out continuously.

It is also favorable that in the entire bleaching process there is only added and used 10 to 40 times the amount of wash and dilution water based on the cellulose to be bleached and accordingly only a smaller amount of waste water results. This was attained by recycling the wash or dilution water within the peroxide steps. Thus the water or dilution water from the second step can be led back into the first step or can be returned from the third step into the second step or first step. Also inside a single step recylcing is possible.

This is equally true for the peracetic acid steps or for peroxide and peracetic acid steps.

We claim:

1. A plural step process for the chlorine free bleaching of cellulose in an aqueous medium comprising bleaching in a first step with a peroxide or hydroperoxide under alkaline conditions wherein the pH is 8–13, then in a second step with a percarboxylic acid or water soluble salt thereof under acid conditions wherein the pH is 4.5–6.5 and then in a third step again with a peroxide or hydroperoxide under alkaline conditions wherein the pH is 8–13.

2. A process according to claim 1 including the step of treating the cellulose with an acid prior to the first bleaching step.

3. A process according to claim 1 wherein the peroxide or hydroperoxide is hydrogen peroxide, sodium peroxide or t-butyl hydroperoxide and the percarboxylic acid or salt thereof is a peralkanoic acid of 2 to 5 carbon atoms or percarbonic acid or water soluble salt thereof.

4. A process according to claim 3 wherein the peralkanoic acid or salt thereof is peracetic acid, perpropionic acid or a salt of such acid.

5. A process according to claim 4 wherein the amount of peroxide or hydroperoxide is 0.5 – 6.0% by weight calculated as 100% hydrogen peroxide and based on the oven dried weight of the cellulose employed and the amount of peralkanoic acid or percarbonic acid or salt thereof is 0.5 – 3.0% by weight calculated as 100% hydrogen peroxide and based on the oven dried weight of the cellulose employed.

6. A process according to claim 5 wherein the bleaching in each step is carried out between 40°C. and the boiling point of the bleach liquor at atmospheric pressure.

7. A process according to claim 1 wherein the bleaching in each step is carried out between 20°C. and 140°C.

8. A process according to claim 7 wherein the total water employed in the process is 10 to 40 times the weight of cellulose to be bleached.

9. A process according to claim 8 wherein dilution water from the second or any subsequent bleaching step is returned to a preceding bleaching step.

10. A process according to claim 1 wherein the peroxide or hydroperoxide is hydrogen peroxide or sodium peroxide and the percarboxylic acid is peracetic acid or perpropionic acid or percarbonic acid.

11. A process according to claim 1 wherein the peroxide or hydroperoxide is hydrogen peroxide, sodium peroxide or t-butyl hydroperoxide and the percarboxylic or salt thereof is a peralkanoic acid of 2 to 5 carbon atoms or water soluble salt thereof.

12. A process according to claim 11 wherein the peralkanoic acid or salt thereof is peracetic acid, perpropionic acid or a salt of such acid.

13. A process according to claim 12 wherein the amount of peroxide or hydroperoxide is 0.5 – 6.0% by weight calculated as 100% hydrogen peroxide and based on the oven dried weight of the cellulose employed and the amount of peralkanoic acid or salt thereof is 0.5 – 3.0% by weight calculated as 100% hydrogen peroxide and based on the oven dried weight of the cellulose employed.

14. A process according to claim 1 wherein the peroxide or hydroperoxide is hydrogen peroxide or sodium peroxide and the percarboxylic acid is peracetic acid or perpropionic acid.

15. A process according to claim 1 wherein the peroxide or hydroperoxide is hydrogen peroxide.

16. A process according to claim 15 wherein the percarboxylic acid or salt thereof is a peralkanoic acid of 2 to 5 carbon atoms or a water soluble salt thereof.

17. A process according to claim 1 wherein the percarboxylic acid or salt thereof is a peralkanoic acid of 2 to 5 carbon atoms or a water soluble salt thereof.

18. A process according to claim 17 terminating with an alkaline peroxide or hydroperoxide bleaching step.

19. A process according to claim 1 wherein there is employed difficultly bleachable cellulose and there is included a fourth step with a percarboxylic acid or water soluble salt thereof and a fifth step with alkaline peroxide or hydroperoxide.

20. A process according to claim 19 wherein the difficultly bleachable cellulose is sulfate cellulose.

* * * * *